(12) United States Patent
Seiler-Thull et al.

(10) Patent No.: US 9,947,973 B2
(45) Date of Patent: Apr. 17, 2018

(54) CELL MOUNTING MODULE FOR AT LEAST ONE ELECTRICAL ENERGY STORAGE CELL, CELL MOUNTING SYSTEM AND METHOD FOR MANUFACTURING A CELL MOUNTING SYSTEM

(71) Applicant: Robert Bosch GmbH, Stuttgart (DE)

(72) Inventors: Daniel Seiler-Thull, Stuttgart (DE); Niko Dorsch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 217 days.

(21) Appl. No.: 14/033,903

(22) Filed: Sep. 23, 2013

(65) Prior Publication Data
US 2014/0087220 A1 Mar. 27, 2014

(30) Foreign Application Priority Data
Sep. 21, 2012 (DE) .................. 10 2012 217 041

(51) Int. Cl.
*H01M 10/613* (2014.01)
*H01M 2/02* (2006.01)
(Continued)

(52) U.S. Cl.
CPC ....... *H01M 10/5004* (2013.01); *H01M 2/105* (2013.01); *H01M 2/1077* (2013.01);
(Continued)

(58) Field of Classification Search
CPC ......... H01M 10/0436; H01M 10/5004; H01M 2/1077; H01M 2/105; H01M 2/202; H01M 2/204; H01M 10/60; H01M 10/613; H01M 10/617; H01M 10/6556; H01M 10/6567; H01M 10/6568
See application file for complete search history.

(56) References Cited

U.S. PATENT DOCUMENTS 6,340,877 B1   1/2002  Mita et al.
2003/0232239 A1* 12/2003 Gow .................. H01M 2/0242
                                                           429/120
(Continued)

FOREIGN PATENT DOCUMENTS

DE        100 64 648       9/2003
DE     10 2008 057 210      5/2010
WO      WO 2010/061063      6/2010

*Primary Examiner* — Jonathan G Jelsma
(74) *Attorney, Agent, or Firm* — Norton Rose Fulbright US LLP; Gerard Messina (57) ABSTRACT

A cell mounting module for at least one electrical energy storage cell, including a module body device having a module region which has at least one cell accommodating recess for accommodating and mounting the at least one electrical energy storage cell, an electrical connection region having at least two electrical pole terminals, and a coolant connection region having at least one coolant inlet for supplying a coolant and at least one coolant outlet for discharging the coolant; at least one electrical connector which is designed to electrically connect the two electrical pole terminals of two identical cell mounting modules; and at last one mechanical connecting means which is designed to connect the at least one coolant inlet and the at least one coolant outlet of two identical cell mounting modules in a fluid-tight manner.

24 Claims, 4 Drawing Sheets

(51) Int. Cl.
  *H01M 2/10* (2006.01)
  *H01M 2/20* (2006.01)
  *H01M 10/625* (2014.01)
  *H01M 10/6557* (2014.01)
  *H01M 10/6567* (2014.01)
  *H01M 10/643* (2014.01)

(52) U.S. Cl.
  CPC ........... *H01M 2/202* (2013.01); *H01M 2/204* (2013.01); *H01M 10/613* (2015.04); *H01M 10/625* (2015.04); *H01M 10/643* (2015.04); *H01M 10/6557* (2015.04); *H01M 10/6567* (2015.04); *H01M 2220/20* (2013.01); *Y10T 29/49117* (2015.01)

(56) References Cited

U.S. PATENT DOCUMENTS

| | | | |
|---|---|---|---|
| 2010/0136405 A1* | 6/2010 | Johnson | H01M 2/105 429/120 |
| 2011/0189527 A1* | 8/2011 | Michelitsch | H01M 2/1077 429/120 |
| 2011/0212355 A1* | 9/2011 | Essinger | H01M 2/1016 429/120 |
| 2011/0244298 A1 | 10/2011 | Guener et al. | |
| 2011/0269008 A1* | 11/2011 | Houchin-Miller | B60L 11/1874 429/120 |
| 2011/0302773 A1 | 12/2011 | Chattot | |
| 2012/0177970 A1* | 7/2012 | Marchio | H01M 2/0237 429/120 |

* cited by examiner

CELL MOUNTING MODULE FOR AT LEAST ONE ELECTRICAL ENERGY STORAGE CELL, CELL MOUNTING SYSTEM AND METHOD FOR MANUFACTURING A CELL MOUNTING SYSTEM

CROSS REFERENCE

The present application claims the benefit under 35 U.S.C. § 119 of German Patent Application No. DE 102012217041.3 filed on Sep. 21, 2012, which is expressly incorporated herein by reference in its entirety.

FIELD

The present invention relates to a cell mounting module, to a cell mounting system and to a method for manufacturing a cell mounting system.

BACKGROUND INFORMATION

An assembly of individual battery cells in a battery box for an electric series-production vehicle is very complex. German Patent Application No. DE 100 64 648 C2 describes, for example, assembling battery cells in individual battery modules. It is important here to minimize the loss of space in which no battery cells are situated when assembling multiple battery modules in an arbitrarily predefined installation space.

German Patent Application No. DE 10 2008 057 210 A1 describes a cell holder, an energy storage cell, a cell holder stack and a multi-cell energy store. The cell holder described there is designed in the form of a housing which is open on one side or both sides and made of an electrically insulating material, the cell holder having a rear wall in which a coolant channel is situated. Multiple cell holders may be assembled via tongue-and-groove joints to form a cell holder stack, which accommodates a plurality of cells. With the aid of this cell holder, good cooling of the accommodated cell may be achieved. In addition, the cell holder ensures good electrical insulation as well as good mechanical protection of the cell. The cell holder is suited in particular for the accommodation of lithium-ion cells in the form of soft packs.

PCT Application No. WO 2010 061 063 A1 describes a system for assembling electrical energy cell modules. The system described there uses two pairs of positive and negative terminals for each energy cell module, in which each of the pairs of positive and negative terminals is distributed over at least one of the outer surfaces of each energy cell module, a terminal strip being contacted with the energy cell modules. At least one junction block may be inserted on a portion of each of the terminal strips made of two separate modules. At least two anchoring points of each junction block are designed as electrical contacts.

SUMMARY

In accordance with the present invention, an example cell mounting module is provided for at least one electrical energy storage cell, including a module body device having a module region which has at least one cell accommodating recess for accommodating and mounting the at least one electrical energy storage cell, an electrical connection region having at least two electrical pole terminals, and a coolant connection region having at least one coolant inlet for supplying a coolant and at least one coolant outlet for discharging the coolant; at least one electrical connector which is designed to electrically connect the two electrical pole terminals of two identical cell mounting modules; and at last one mechanical connector which is designed to connect the at least one coolant inlet and the at least one coolant outlet of two identical cell mounting modules in a fluid-tight manner.

The present invention further provides an example cell mounting system which includes at least two cell mounting modules.

According to a further aspect, the present invention provides an example method for manufacturing a cell mounting system, including the following: providing a module body device, at least one electrical connector and at least one mechanical connector; and assembling the module body device, the at least one electrical connector and the at least one mechanical connector to manufacture the cell mounting system.

In accordance with the present invention, the cell mounting system may include a plurality of cell mounting modules which connect the energy storage cells to each other and integrate additional functions, such as water cooling. Using a simple push-on attachment process of the cell mounting modules to form a single mechanically stable overall module in the form of a cell mounting system, arbitrary electrical energy storage systems may be implemented. Separating the overall module into stable sub-units results in considerably simpler handling of the cell mounting system and in increased structural safety of the cell mounting system.

According to one specific embodiment of the present invention, it is provided that the at least one cell accommodating recess has an elastic element which is designed to press the at least one electrical energy storage cell situated in the cell accommodating recess against the at least one cell accommodating recess. This advantageously allows the thermal contact between the electrical energy storage cell and the cell mounting module to be improved.

According to one further specific embodiment of the present invention, it is provided that the module body device is made of a plastic material, a composite material or a fiber composite. Implementation from a plastic material or implementation as an injection-molded plastic part enables cost-effective production and the integration of a plurality of functions of the module body device.

According to one further specific embodiment of the present invention, it is provided that the module region and/or the electrical connection region and/or the coolant connection region are designed in one piece with the module body device. This allows cost-effective manufacturing of the cell mounting module.

According to one further specific embodiment of the present invention, it is provided that a passage for the coolant from the at least one coolant inlet of the coolant connection region to the at least one coolant outlet of the coolant connection region is formed.

According to one further specific embodiment of the present invention, it is provided that the passage for the coolant is designed to conduct the coolant to the at least one cell accommodating recess and thereby generate a cooling effect of the coolant for the at least one energy storage cell.

According to one further specific embodiment of the present invention, it is provided that the cell mounting module further includes at least one electrical fuse, which is insertable into a recess of the module body device and which is designed to prevent an electrical short-circuit of the at least one electrical energy storage cell.

According to one further specific embodiment of the present invention, it is provided that the cell mounting module includes at least one current collector panel for electrically connecting the at least one electrical energy storage cell of the cell mounting module.

The described embodiments and refinements may be arbitrarily combined with each other.

Further possible embodiments, refinements and implementations of the present invention also include not explicitly described combinations of features of the present invention which are described at the outset or hereafter with respect to the exemplary embodiments.

BRIEF DESCRIPTION OF THE DRAWINGS

The figures provide further understanding of the specific embodiments of the present invention. They illustrate specific embodiments and, in conjunction with the description below, are used to explain principles of the present invention.

Other specific embodiments and many of the described advantages result with respect to the figures. The elements shown in the drawings are not necessarily illustrated true to scale in relation to each other.

DETAILED DESCRIPTION OF EXAMPLE EMBODIMENTS

In the figures, identical reference numerals denote identical or functionally equivalent elements, parts, components or method steps, unless indicated otherwise.

Figure 1:
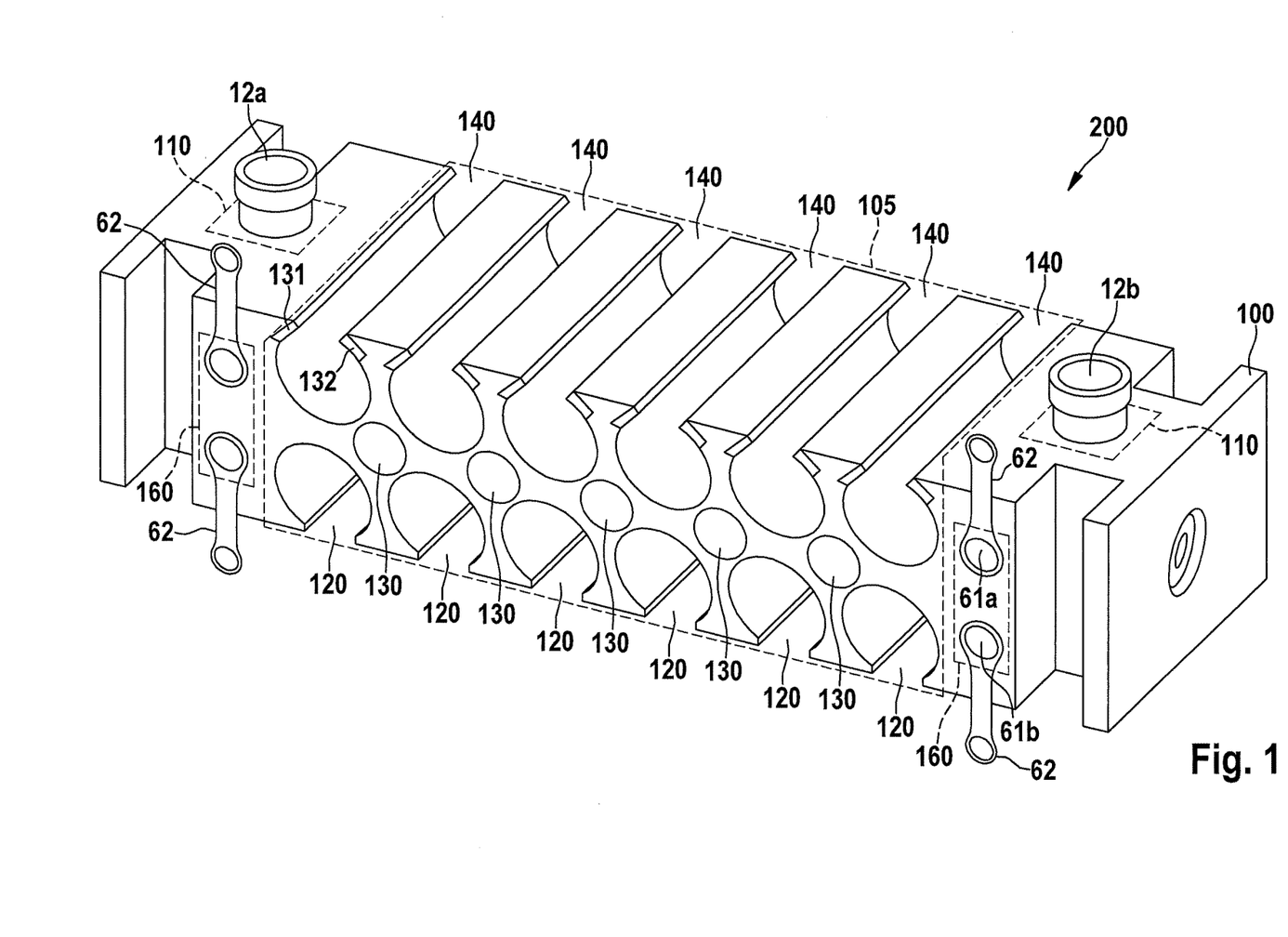
FIG. 1 shows a schematic illustration of a cell mounting module for at least one electrical energy storage cell according to one specific embodiment of the present invention.

FIG. 1 shows a schematic illustration of a cell mounting module according to one specific embodiment of the present invention.

A cell mounting module 200 for at least one electrical energy storage cell includes a module body device 100, at least one electrical connector 62, and at least one mechanical connector 12a, 12b.

Module body device 100 includes a module region 105, an electrical connection region 160, and a coolant connection region 110.

Module region 105 includes at least one cell accommodating recess 120, 140 for accommodating and mounting the at least one electrical energy storage cell.

Electrical connection region 160 includes at least two electrical pole terminals 61a, 61b.

Coolant connection region 110 includes at least one coolant inlet 110a, 110b for supplying a coolant 5 and at least one coolant outlet 111a, 111b for discharging coolant 5.

The at least one electrical connector 62 is designed, for example, to electrically connect the two electrical pole terminals 61a, 61b of two identical cell mounting modules 200. The at least one electrical connecting means 62 may be designed as a connector panel or as an electrical flat connector or as any other pluggable connector.

The at least one mechanical connector 12a, 12b is designed, for example, to connect the at least one coolant inlet 110a, 110b and the at least one coolant outlet 111a, 111b of two identical cell mounting modules 200 in a fluid-tight manner. The at least one mechanical connector 12a, 12b may be designed as a pluggable plastic pipe joint or as any other pipe joint.

Module body device 100 further includes openings 130 for transverse pins 30.

Module body device 100 is designed, for example, as a plastic body having an entry in the form of coolant inlets 110a, 110b and having an exit in the form of coolant outlets 111a, 111b for cooling fluid. Moreover, a hydraulic connection may implement a secure mechanical joint.

Electrical connector 62 may be designed as a plug-in device, which implements an electrical connection when the cell mounting modules 200 are plugged together. This may be implemented by overlapping of the current collector panels of the cell mounting modules 200.

Elastic elements 131, 132 in the cell accommodating recesses 120, 140 may press the electrical energy storage cells against the module body device 100 for increased and/or secure thermal contact.

Module body device 100 may further include guides for measuring lines. The guides for the measuring lines may be accessible from the outside to enable particularly easy and reliable checking of the electrical function of cell mounting module 200.

Module body device 100 may further be made of a metal, such as aluminum, copper, or an aluminum-copper alloy, for example. Module body device 100 may further be designed to be pluggable in two directions, for example on top of and next to each other. The two directions may enclose a right angle, i.e., an angle of 90°.

For cooling module body device 100, additionally a separate component may be used, which may be coupled to the module body device 100 using the same plug-in system made of a mechanical connector and an electrical connector.

Figure 2:
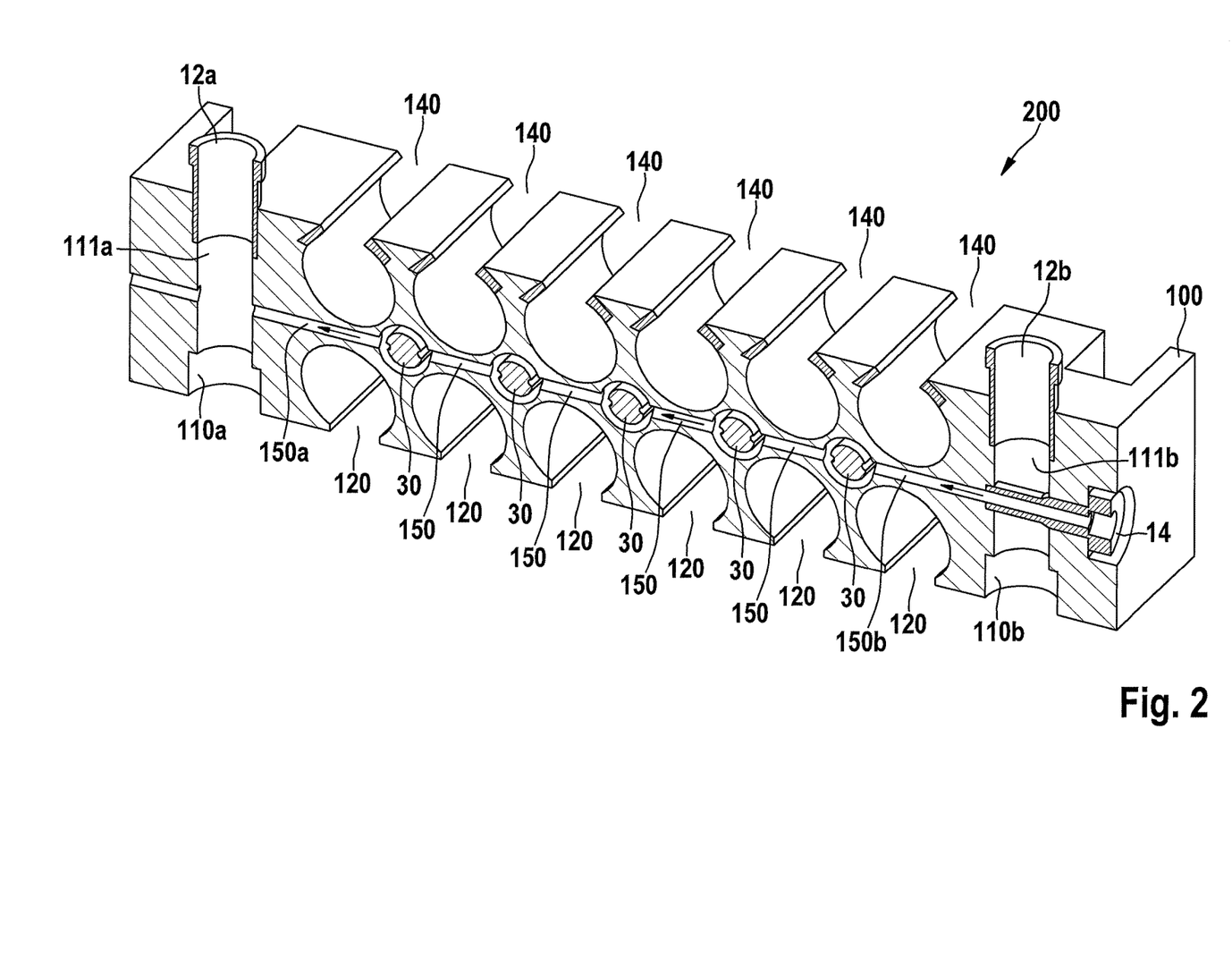
FIG. 2 shows a schematic illustration of a section through a cell mounting module for at least one electrical energy storage cell according to one further specific embodiment of the present invention.

FIG. 2 shows a schematic illustration of a section through a cell mounting module for at least one electrical energy storage cell according to one further specific embodiment of the present invention.

In cell mounting module 200 shown in FIG. 2, the section runs in the plane defined by coolant inlet 110a, 110b and coolant outlet 111a, 111b.

One half of a cell mounting module 200 is illustrated in FIG. 2. Boreholes or openings 130 for transverse pins 30 have a round cross section. Cell accommodating recesses 120, 140 for the at least one electrical energy storage cell are situated in each case offset from boreholes or openings 130 for transverse pins 30.

For this purpose, a subset of cell accommodating recesses 120, 140 is situated beneath boreholes or openings 130 for transverse pins 30, and a further subset of cell accommodating recesses 120, 140 is situated above boreholes or openings 130 for transverse pins 30. Passages 150 connect boreholes or openings 130 for transverse pins 30 to each other.

A first passage 150a connects a coolant inlet 110a to passages 150, and a second passage 150b connects a coolant outlet 111b to passages 150. Moreover, a coolant controller 14 may be provided in cell mounting module 200, the controller being able to adjust a flow rate of coolant 5 from coolant inlet 110b to passages 150. Coolant controller 14 may be designed as a hydraulic control valve and may control the flow rate of coolant 5 through cell mounting module 200 with the aid of the valve flow rate value.

The arrows in the figure illustrate the flow of coolant 5 through passages 150 and along the surfaces of transverse pins 30, with coolant being spread by transverse pins 30.

Figure 3:
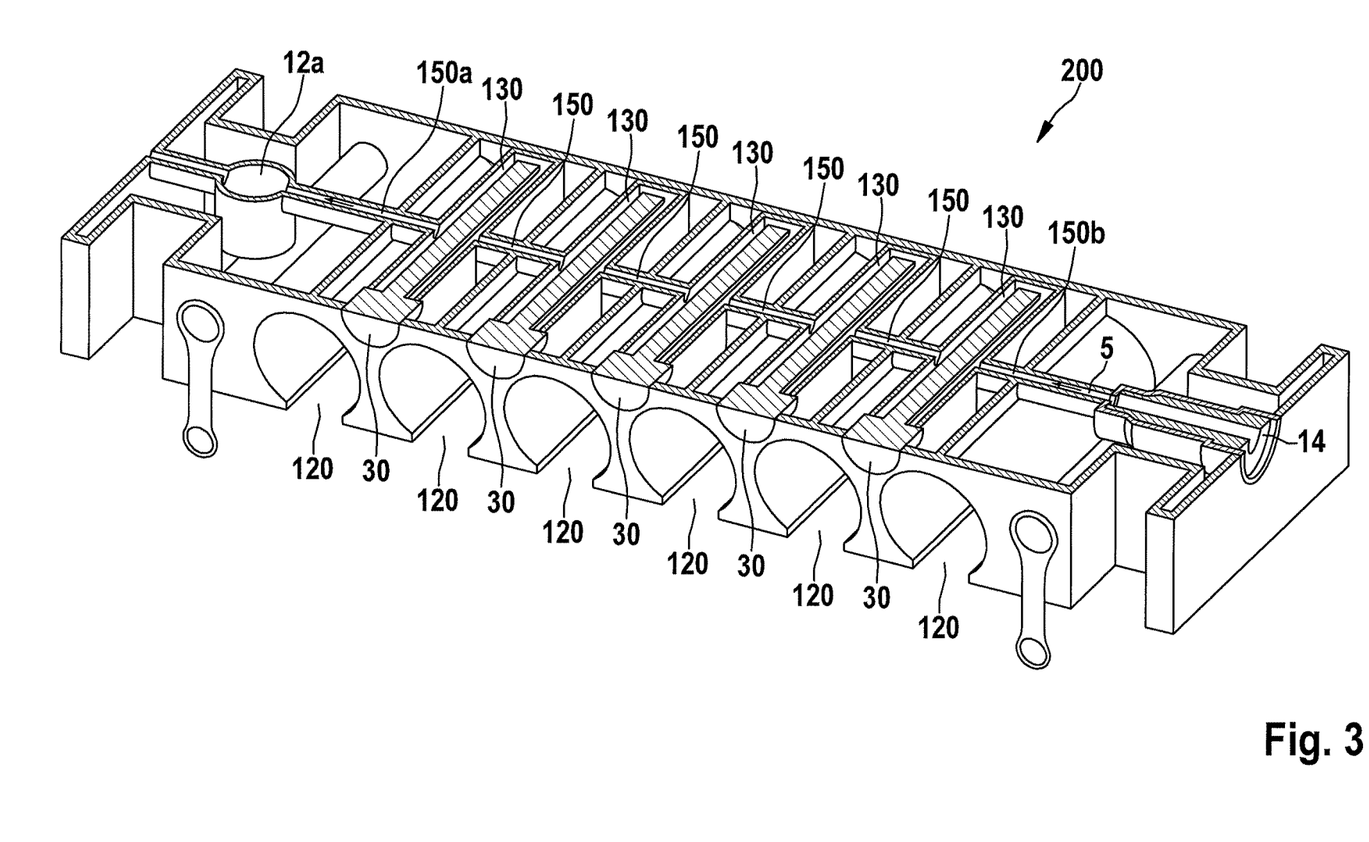
FIG. 3 shows a schematic illustration of a section through a cell mounting module for at least one electrical energy storage cell to illustrate a flow of a coolant according to one further specific embodiment of the present invention.

FIG. 3 shows a schematic illustration of a section through a cell mounting module for at least one electrical energy storage cell to illustrate a flow of a coolant according to one further specific embodiment of the present invention.

A bottom half of a cell mounting module 200 for at least one electrical energy storage cell is illustrated in FIG. 3. In cell mounting module 200 shown in FIG. 3, the section runs along a plane defined by coolant inlets 110a, 110b and coolant outlets 111a, 111b.

The illustrated arrows illustrate the flow of coolant 5 through passages 150 and along the surfaces of transverse pins 30, with coolant being spread by transverse pins 30.

The further reference numerals shown in FIG. 3 have already been explained in the description associated with FIG. 2 and will therefore not be described further.

Figure 4:
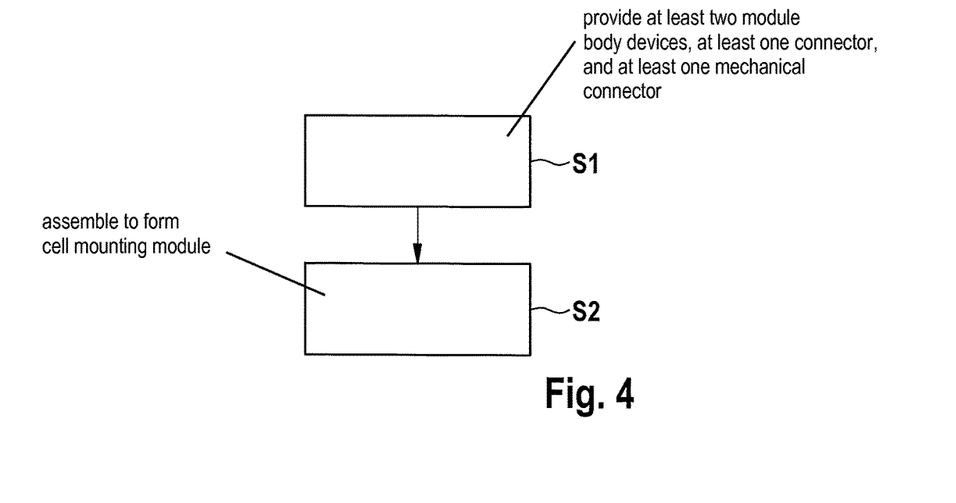
FIG. 4 shows a schematic illustration of a method for manufacturing a cell mounting module for at least one electrical energy storage cell according to one specific embodiment of the present invention.

FIG. 4 shows a schematic illustration of a flow chart of the method for manufacturing a cell mounting module for at least one electrical energy storage cell according to one further specific embodiment of the present invention.

The method for manufacturing a cell mounting module 200 for at least one electrical energy storage cell includes the following method steps:

As a first method step, a provision S1 takes place of at least two module body devices 100, at least one electrical connector 62 and at least one mechanical connector 12a, 12b.

As a second method step, an assembly S2 takes place of the at least two module body devices 100, the at least one electrical connector 62 and the at least one mechanical connector 12a, 12b to manufacture cell mounting module 200.

Assembly S2 of module body device 100 may take place by pushing the module body devices 100 onto each other.

Figure 5:
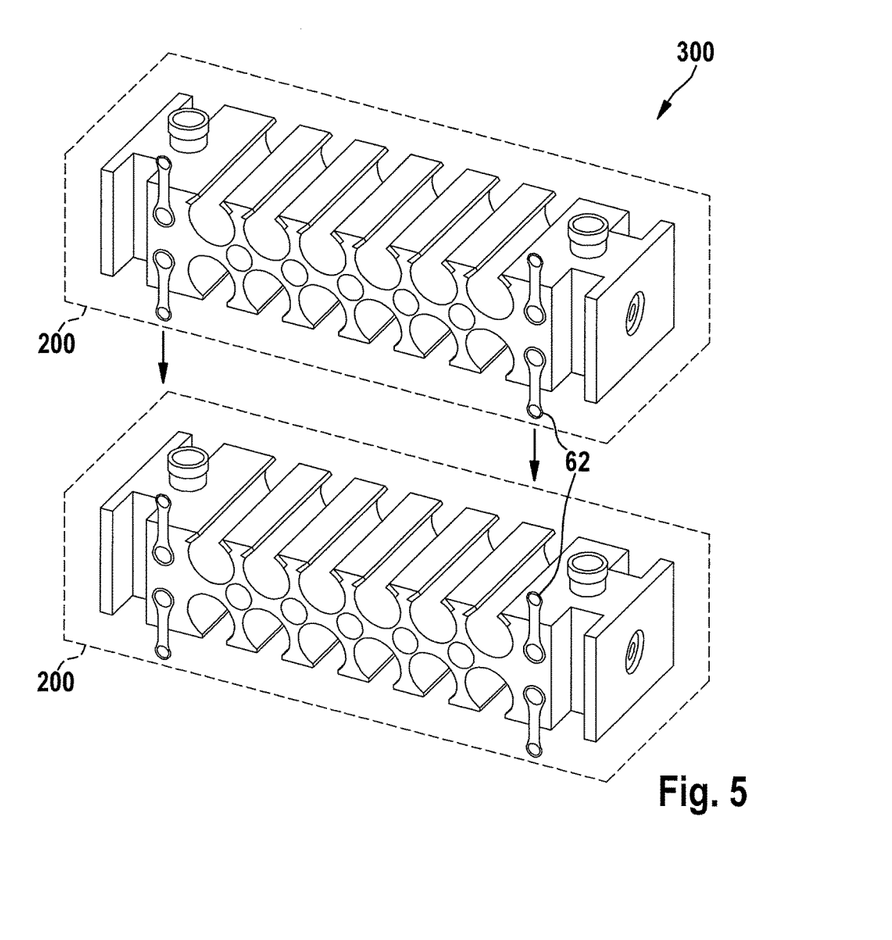
FIG. 5 shows a schematic illustration of a cell mounting system having two cell mounting modules for at least one electrical energy storage cell according to one further specific embodiment of the present invention.

FIG. 5 shows a schematic illustration of a cell mounting system according to one further specific embodiment of the present invention.

A cell mounting system 300 includes two cell mounting modules 200, which are pushed onto each other. In addition to the one shown direction, in which two cell mounting modules 200 are pushed onto each other, it is also possible that cell mounting modules 200 may be pushed onto each other in two directions and that the two directions enclose a right angle, i.e., an angle of 90°.

Although the present invention has been described above based on preferred exemplary embodiments, it is not limited thereto, but is modifiable in a variety of ways. The present invention may in particular be changed or modified in multiple ways without departing from the core of the present invention.

What is claimed is:

1. A first cell mounting module for electrical energy storage cells, comprising:
   a module body device having a module region which has cell accommodating recesses to accommodate and mount respective ones of the electrical energy storage cells, an electrical connection region having at least two electrical pole terminals at a surface of the module body device, and a coolant connection region having at least one coolant inlet to supply a coolant and at least one coolant outlet to discharge the coolant;
   at least one electrical connector, each to electrically connect a respective one of the at least two electrical pole terminals to a respective electric pole terminal of a respective other cell mounting module that is identical to the first cell mounting module, wherein each of the at least one electrical connector extends away from its respective one of the electrical pole terminals of the first cell mounting module in a direction along the surface of the module body device of the first cell mounting module;
   at least one mechanical connector, each structured to plug directly into a respective corresponding mechanical connector of one of the other cell mounting modules to connect the at least one coolant inlet and the at least one coolant outlet of the first cell mounting module to the at least one coolant inlet and the at least one coolant outlet of the one of the other cell mounting modules in a fluid-tight manner;
   boreholes or openings having a round cross section and a longitudinal axis that is approximately perpendicular to the surface of the module body device at which the at least two electrical pole terminals are located; and
   pins arranged in respective ones of the boreholes or openings;
   wherein:
      each of the cell accommodating recesses is situated offset from the boreholes or openings;
      the boreholes or openings are situated, and longitudinally extend in a direction from one end face of the first cell mounting module to another opposite end face of the first cell mounting module, in a mid-region of the module body device;
      in a lower region of the module body device that is, in a direction that is perpendicular to the longitudinal extension of the boreholes or openings, beneath the mid-region, a first subset of the cell accommodating recesses longitudinally extend in a direction parallel to the longitudinal extension of the boreholes or openings;
      in an upper region of the module body device that is, in the direction that is perpendicular to the longitudinal extension of the boreholes or openings, above the mid-region, a second subset of the cell accommodating recesses longitudinally extend in the direction parallel to the longitudinal extension of the boreholes or openings; and
      with respect to an axis whose direction is perpendicular to the longitudinal extension of the boreholes or openings, each of one or more of the boreholes or openings longitudinally extends at a coordinate of the axis that is between respective coordinates at which two adjacent ones of the cell accommodating recesses longitudinally extend.

2. The first cell mounting module as recited in claim 1, wherein at least one of the following:
   (A) the cell accommodating recesses longitudinally extend in a first direction, which is from one side of the module body device towards an opposite side of the module body device and which is perpendicular to at least one of:
      (i) a direction in which the first cell mounting module is configured to connect to the other cell mounting module; and (ii) a direction in which the at least one electrical connector extends along the surface of the cell mounting module;

(B) the at least one mechanical connector is arranged between, and extends longitudinally parallel to, two end faces of the first cell mounting module, one of the end faces being the surface along which the at least one electrical connector extends; and (C) at least some of the cell accommodating recesses are arranged side by side with respect to a direction that is perpendicular to (1) a direction in which the first cell mounting module plugs into the other cell mounting module and (2) a direction of positional offset between a position at which the at least one mechanical connector longitudinally extends and a position at which the at least one electrical connector longitudinally extends.

3. The first cell mounting module as recited in claim 1, wherein the cell accommodating recesses have an elastic element designed to press the at least one electrical energy storage cell situated in the respective cell accommodating recesses against the respective cell accommodating recesses.

4. The first cell mounting module as recited in claim 1, wherein the module body device is made of a plastic material, a composite material, or a fiber composite.

5. The first cell mounting module as recited in claim 1, wherein the cell mounting module includes a passage for the coolant from the at least one coolant inlet of the coolant connection region to the at least one coolant outlet of the coolant connection region.

6. The first cell mounting module as recited in claim 5, wherein the passage for the coolant is designed to conduct the coolant to the at least one cell accommodating recess and thereby generate a cooling effect of the coolant for the at least one energy storage cell.

7. The first cell mounting module as recited in claim 1, wherein the cell mounting module further includes at least one electrical fuse, which is insertable into a recess of the module body device and which is designed to prevent an electrical short-circuit of the at least one electrical energy storage cell.

8. The first cell mounting module as recited in claim 1, wherein the cell mounting module has at least one current collector panel to electrically connect the at least one electrical energy storage cell of the cell mounting module.

9. The first cell mounting module as recited in claim 1, wherein the surface of the module body device at which the at least two electrical pole terminals are located is a side surface, and the at least one mechanical connector extends out of a top surface of the cell mounting module.

10. The first cell mounting module as recited in claim 1, wherein the surface of the module body device at which the at least two electrical pole terminals are located is a side surface, and each of the at least one electrical connector extends one of (a) upward towards and past a plane of a top surface of the cell mounting module and (b) downward towards and past a bottom surface of the cell mounting module.

11. The first cell mounting module as recited in claim 1, wherein the cell accommodating recesses are for housing respective electrical storage energy cells.

12. The first cell mounting module as recited in claim 1, wherein the cell accommodating recesses for the electrical energy storage cells are situated in each case offset from the boreholes or openings.

13. The first cell mounting module as recited in claim 1, wherein the at least one electrical connector of the first cell mounting body includes a first electrical connector that extends upwards for connecting to a first other cell mounting module and a second electrical connector that extends downwards for connecting to a second other cell mounting module.

14. The first cell mounting module as recited in claim 1, wherein the cell accommodating recesses include respective elastic elements configured to apply a force in a direction that is perpendicular to a longitudinal extension of the respective cell accommodating recesses, to thereby press the respective electrical energy storage cell situated in the respective cell accommodating recess against a wall of the respective cell accommodating recess.

15. The first cell mounting module as recited in claim 1, wherein the boreholes longitudinally extend between longitudinal extensions of the plurality of cell accommodating recesses and are connected by channels to the at least one coolant inlet and the at least one coolant outlet.

16. The first cell mounting module as recited in claim 15, wherein the channels are arranged for flow of the coolant from the at least one coolant inlet in a direction transverse to the longitudinal extensions of the cell accommodating recesses and the boreholes are arranged for flow of the coolant from the channels in a direction parallel to the longitudinal extensions of the cell accommodating recesses.

17. The first cell mounting module as recited in claim 1, wherein the pins extend longitudinally parallel to a longitudinal extension of the cell accommodating recesses and are configured to spread the coolant longitudinally alongside the cell accommodating recesses.

18. The first cell mounting module system as recited in claim 1, wherein the each of the at least one mechanical connector extends longitudinally in a direction towards the one of the other cell mounting modules.

19. The first cell mounting module as recited in claim 2, wherein the cell accommodating recesses longitudinally extend in the first direction, which is from one side of the module body device towards the opposite side of the module body device and which is perpendicular to the direction in which the first cell mounting module is configured to connect to the other cell mounting module.

20. The first cell mounting module as recited in claim 2, wherein the cell accommodating recesses longitudinally extend in the first direction, which is from one side of the module body device towards an opposite side of the module body device and which is perpendicular to the direction in which the at least one electrical connector extends along the surface of the cell mounting module.

21. The first cell mounting module as recited in claim 2, wherein the at least one mechanical connector is arranged between, and extends longitudinally parallel to, the two end faces of the first cell mounting module, one of the end faces being the surface along which the at least one electrical connector extends.

22. The first cell mounting module as recited in claim 2, wherein at least some of the cell accommodating recesses are arranged side by side with respect to the direction that is perpendicular to (1) the direction in which the first cell mounting module plugs into the other cell mounting module and (2) the direction of positional offset between the position at which the at least one mechanical connector longitudinally extends and the position at which the at least one electrical connector longitudinally extends.

23. A first cell mounting module for electrical energy storage cells, comprising:
a module body device having a module region which has cell accommodating recesses to accommodate and mount respective ones of the electrical energy storage cells, an electrical connection region having at least two electrical pole terminals at a surface of the module body device, and a coolant connection region having at least one coolant inlet to supply a coolant and at least one coolant outlet to discharge the coolant;

at least one electrical connector, each to electrically connect a respective one of the at least two electrical pole terminals to a respective electric pole terminal of a respective other cell mounting module that is identical to the first cell mounting module, wherein each of the at least one electrical connector extends away from its respective one of the electrical pole terminals of the first cell mounting module in a direction along the surface of the module body device of the first cell mounting module;

at least one mechanical connector, each structured to plug directly into a respective corresponding mechanical connector of one of the other cell mounting modules to connect the at least one coolant inlet and the at least one coolant outlet of the first cell mounting module to the at least one coolant inlet and the at least one coolant outlet of the one of the other cell mounting modules in a fluid-tight manner; and boreholes or openings to accommodate pins having a round cross section and a longitudinal axis that is approximately perpendicular to the surface of the module body device at which the at least two electrical pole terminals are located;

wherein:

each of the cell accommodating recesses is situated offset from the boreholes or openings;

the boreholes or openings are situated, and longitudinally extend in a direction from one end face of the first cell mounting module to another opposite end face of the first cell mounting module, in a mid-region of the module body device;

in a lower region of the module body device that is, in a direction that is perpendicular to the longitudinal extension of the boreholes or openings, beneath the mid-region, a first subset of the cell accommodating recesses longitudinally are arranged in their entireties and extend in a direction parallel to the longitudinal extension of the boreholes or openings;

in an upper region of the module body device that is, in the direction that is perpendicular to the longitudinal extension of the boreholes or openings, above the mid-region, a second subset of the cell accommodating recesses are arranged in their entireties and longitudinally extend in the direction parallel to the longitudinal extension of the boreholes or openings;

with respect to an axis whose direction is perpendicular to the longitudinal extension of the boreholes or openings, each of one or more of the boreholes or openings longitudinally extends at a coordinate of the axis that is between respective coordinates at which two adjacent ones of the cell accommodating recesses longitudinally extend; and the boreholes or holes are each sandwiched between at least two respective ones of the cell accommodating recesses.

24. A first cell mounting module for electrical energy storage cells, comprising:

a module body device having a module region which has a plurality of cell accommodating recesses to accommodate and mount the electrical energy storage cells, an electrical connection region having at least two electrical pole terminals at a surface of the module body device, and a coolant connection region having at least one coolant inlet to supply a coolant and at least one coolant outlet to discharge the coolant;

at least one electrical connector, each to electrically connect a respective one of the at least two electrical pole terminals to a respective electric pole terminal of a respective other cell mounting module that is identical to the first cell mounting module, wherein each of the at least one electrical connector extends away from its respective one of the electrical pole terminals of the first cell mounting module in a direction along the surface of the module body device of the first cell mounting module;

at least one mechanical connector, each structured to plug directly into a respective corresponding mechanical connector of one of the other cell mounting modules to connect the at least one coolant inlet and the at least one coolant outlet of the first cell mounting module to the at least one coolant inlet and the at least one coolant outlet of the one of the other cell mounting modules in a fluid-tight manner;

boreholes that longitudinally extend between longitudinal extensions of the plurality of cell accommodating recesses and that are connected by channels to the at least one coolant inlet and the at least one coolant outlet; and pins, each within a respective one of the boreholes and configured to spread the coolant in a direction parallel to the longitudinal extensions of the cell accommodating recesses.

* * * * *